United States Patent Office 3,029,250
Patented Apr. 10, 1962

3,029,250
SUCCINIMIDE COMPOUNDS
Van R. Gaertner, Dayton, Ohio, assignor to Monsanto Chemical Company, St. Louis, Mo., a corporation of Delaware
No Drawing. Filed Sept. 3, 1959, Ser. No. 837,781
7 Claims. (Cl. 260—326.5)

This invention relates to new succinimide compounds. More particularly this invention relates to N-sulfoalkyl-α-alkenylsuccinimides.

It is an object of this invention to provide new succinimide compounds.

It is a more specific object of this invention to provide N-sulfoalkyl-α-alkenylsuccinimides.

It is another object of this invention to provide a method for making N-sulfoalkyl-α-alkenylsuccinimides.

It is yet another object of this invention to provide new surface active agents.

According to this invention, new N-sulfoalkyl-α-alkenylsuccinimides having the general formula

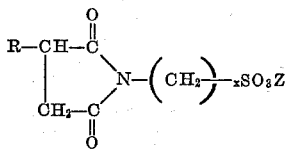

wherein R is an alkenyl radical having from 8 to 20 carbon atoms, $x$ is a small whole number of from 2 to 4, and Z is a salt forming cation, can be prepared by dehydrating an N-(sulfoalkyl)-α-alkenylsuccinamic acid salt, thereby effecting a cyclization reaction according to the equation

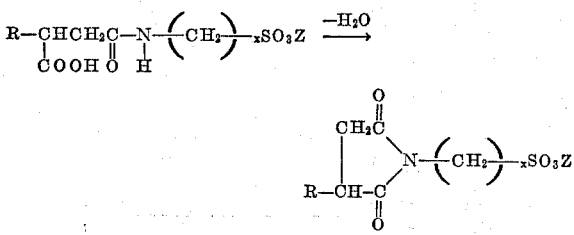

wherein R, $x$, and Z are as defined above.

The N-(sulfoalkyl)-α-alkenylsuccinamic acid starting material can be prepared according to the method disclosed in my copending application, S.N. 858,599, filed December 10, 1959, i.e., by reacting an alkenylsuccinic anhydride with an aminoalkanesulfonate salt. The alkenylsuccinic anhydride reactants are in turn usually prepared by condensing an olefin with maleic anhydride. The olefins employed in the condensation are relatively long carbon chains having from 8 to 20 carbon atoms, and they are aliphatic or alicyclic, straight or branched, monoolefins. The method of condensation and the condensation product are not part of this invention. Generally, however, the olefin attaches to the anhydride through one of its double bond carbons, with elimination of the double bond from the anhydride and progression of the double bond of the olefin to an adjacent carbon thereof.

The aminoalkanesulfonate salts, used to react with the alkenylsuccinic anhydride are water solubilizing salts of taurine, 3-amino-1-propanesulfonic acid, 4-amino-1-butanesulfonic acid, and are usually prepared by reacting a $C_2$–$C_4$ olefin epoxide with a water soluble salt of sulfurous acid such as sodium bisulfite, followed by reaction with ammonia.

A few examples of alkenylsuccinamic acid compounds which are used as reactants forming the compounds of this invention are the water solubilizing salts, e.g., alkali metal, ammonium, diethylammonium, and triethylammonium salts of N-(3-sulfopropyl)-α-tetrapropenylsuccinamic acid,
N-(2-sulfoethyl)-α-triisobutenylsuccinamic acid,
N-(4-sulfobutyl)-α-pentadecenylsuccinamic acid,
N-(3-sulfopropyl)-α-octadecenylsuccinamic acid,
N-(2-sulfoethyl)-α-tetraisopropenylsuccinamic acid,
N-(4-sulfobutyl)-α-eisodecenylsuccinamic acid.

Dehydration of the N-(sulfoalkyl)-α-alkenylsuccinamic acid starting materials may be effected by gently heating the material in the presence of a non-reactive dehydrating agent, either organic, such as acetic anhydride, succinic anhydride, maleic anhydride, or an inorganic material which will function as a water absorber, to take up the water given off by the succinamic acid compound during its dehydrating cyclization reaction. The mixture is preferably first heated to from 100 to 150° C., depending upon the dehydrating agent used, usually for about 1 to 10 hours to reflux the mixture, to insure complete reaction, and then heated to a higher temperature to distill off the dehydrating agent, leaving as a residue the substantially pure N-sulfoalkyl-α-alkenylsuccinimide salt.

The compounds of this invention are stable, resinous, or crystalline solids at ordinary temperatures. They are completely water soluble and are high foamers. They have many industrial and agricultural uses but are especially useful as surface active agents.

These materials are very useful as detergents, lime soap dispersants, wetting agents, lathering agents, emulsifying agents, and hence are useful in detergent compositions. They are useful in household cleaning compositions, dry cleaning compositions, and metal cleaning compositions. They are valuable additives to rubber latices, road building materials as air entraining agents for concrete and cement.

*Example 1*

25.0 g. of sodium N-(3-sulfopropyl)-α-triisobutenyl-succinamic acid, prepared by reacting sodium γ-amino-propanesulfonate with triisobutenylsuccinic anhydride, were mixed with 50 ml. of acetic anhydride and the resulting mixture was stirred and heated for 3 hours at 120–125° C. The mixture was refluxed for 6 additional hours. The acetic anhydride was distilled off and then the temperature was raised to 240–250° C. for one hour. The flask was cooled to room temperature and the residue therein was treated with isopropyl alcohol in which the residue is insoluble. 100 ml. of distilled water was added and the mixture was heated to dissolve the residue. The solution was filtered to remove some flocculated material. The water and isopropyl alcohol solvent was removed by distillation, leaving 18.0 g. of a dark red-brown crystalline residue, sodium N-(3-sulfopropyl)α-triisobutenylsuccinimide. It was redried at 56° C./1 mm. and analyzed as follows:

|           | Found | Calcd. for $C_{19}H_{32}NNaO_5S$ |
|-----------|-------|----------------------------------|
| Percent C | 52.99 | 55.7                             |
| Percent H | 7.60  | 7.87                             |
| Percent N | 3.26  | 3.42                             |
| Percent S | 7.99  | 7.82                             |

*Example 2*

According to a lime soap dispersion test by J. C. Harris in an American Society for Testing Materials Bulletin, No. 140, May 1946, entitled "Evaluation of Surface Active Agents," materials which are effective as lime soap dispersants have a rating of from 10 to 80, with 10 being the best obtainable rating. Sodium N-(sulfopropyl)-α-triisobutenylsuccinimide, a compound of this invention, was given a good rating of 40.

The compounds of this invention are good wetting agents. The Draves Wetting Test of the American Association of Textile Chemists, was used to determine the wetting efficiencies of these compounds. For example, sodium N-(3-sulfopropyl)-α-triisobutenylsuccinimide was tested to determine its wetting time in seconds at the concentrations indicated in the table below:

| Percent concentration | Wetting time (in seconds) |
|---|---|
| 0.5 | 2.0 |
| 0.25 | 5.9 |

What is claimed is:
1. Compounds of the formula

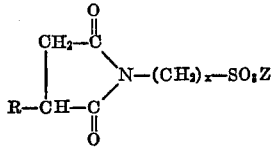

wherein R is an α-kenyl radical having from 8 to 20 carbon atoms, x is a small whole number of from 2 to 4 and Z is a cation forming a water soluble salt.

2. Compounds of the formula

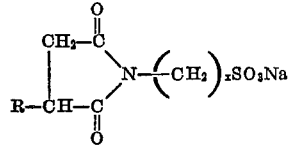

wherein R is an α-alkenyl radical having from 8 to 20 carbon atoms, and x is a small whole number of from 2 to 4.

3. Sodium N-(3-sulfopropyl) - α - triisobutenylsuccinimide.

4. The method of preparing compounds of the formula

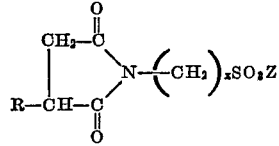

wherein R is an α-alkenyl radical having from 8 to 20 carbon atoms, x is a small whole number of from 2 to 4, and Z is a cation forming a water soluble salt, which comprises heating a compound of the formula

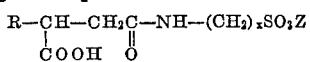

wherein R, x, and Z are as defined above, under anhydrous conditions.

5. The method which comprises mixing a compound having the formula

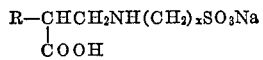

wherein R is an α-alkenyl radical having from 8 to 20 carbon atoms, x is a small whole number of from 2 to 4, with a dehydrating agent, and heating the resulting mixture for a time sufficient to effect the formation of a compound of the formula

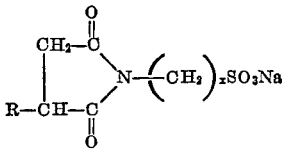

wherein R, x and Z are defined above.

6. The method which comprises mixing sodium N-(3-sulfopropyl)α-triisobutenylsuccinamic acid with acetic anhydride, and heating the mixture for a time sufficient to effect the formation of sodium N-(3-sulfopropyl)-α-triisobutenylsuccinimide.

7. Compounds of the formula

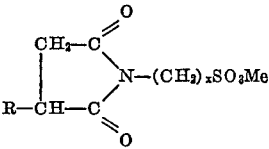

wherein R is an α-alkenyl radical having from 8 to 20 carbon atoms, x is a small whole number of from 2 to 4 and Me is a cation selected from the group consisting of alkali metal, ammonium, diethylammonium, and triethylammonium ions.

References Cited in the file of this patent
UNITED STATES PATENTS

| 2,444,536 | Searle | July 6, 1948 |
| 2,643,258 | Miller et al. | June 23, 1953 |
| 2,788,349 | Snyder | Apr. 9, 1957 |